United States Patent Office 3,759,701
Patented Sept. 18, 1973

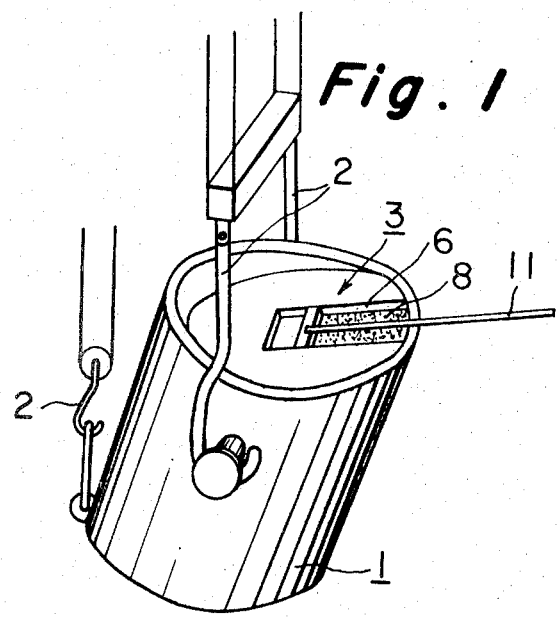
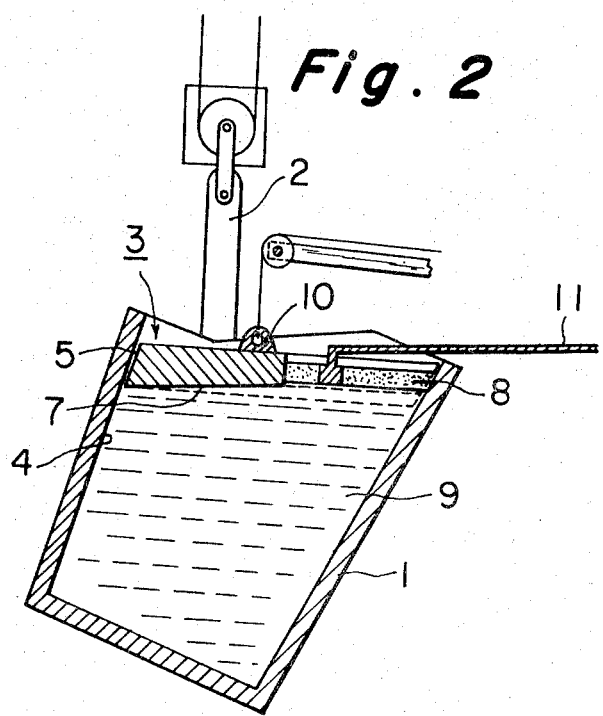

3,759,701
METHOD AND A DEVICE FOR SLAG-REMOVAL
Masashi Kawana, Makoto Saegusa, Kenzo Ohsugi, and Naohiro Nohara, Kurashiki, Japan, assignors to Kawasaki Steel Corporation, Kobe City, Japan
Filed June 22, 1970, Ser. No. 48,110
Claims priority, application Japan, June 22, 1970, 45/53,076
Int. Cl. C21c 7/00
U.S. Cl. 75—61   5 Claims

ABSTRACT OF THE DISCLOSURE

A device, as well as a method, for easy and complete removal of slag from a molten metal, which device consists of a plate member fitting in the top of a vessel containing the molten metal and a hole bored through the plate member. The shape of the bottom surface and the apparent specific gravity of the plate member are such that the slag is collected to the hole as the plate member is placed on the molten metal, for ensuring separation thereof.

---

This invention relates to a device and a method for removing slag from a molten metal, and more particularly to a device and a method for readily and completely removing slag from a molten metal by disposing a plate member on the upper portion of a vessel holding the molten metal, which plate member has a hole bored therethrough and an inclined lower surface, the apparent specific gravity of the plate member being such that the slag may be collected in the form of a layer at the hole while being isolated from the molten metal.

A molten metal, such as molten pig iron as delivered from a blast furnace or an electric furnace, or a molten steel as delivered from a refining furnace like a converter, contains impurities of various kinds. Such impurities have heretofore been removed by transferring the molten metal in a suitable vessel, e.g., a ladle, and converting the impurities into slag by adding one or more slag making agents and additives for varying the composition of the metal. The slag thus formed is forced to float on the top of the molten metal by the buoyance due to the difference of the specific gravity between the slag and the metal and the slag floating on the top surface of the molten metal can then be removed from the molten metal by a suitable mechanical means. It has not been easy to completely remove such slag from the molten metal. Incomplete removal of the slag is undesirable, because the residual slag may redissolve in the molten metal as impurities in the desired refined metal.

For instance, molten pig iron as delivered from a blast furnace is transferred into a ladle, and a suitable desulfurizer, such as carbide and soda ash, is added therein to cause sulfur contained in the pig iron to float on the surface of the molten iron as slag. The slag floating on the molten iron is then removed. If, however, the slag is not completely removed, a part of the sulfur thus isolated may dissolve again in the iron. When iron or steel is further refined, such residual ingredients, e.g., sulfur, may adversely affect the refining process. Accordingly, any residue of such ingredients is not desirable.

Molten steel, as refined by a converter, may contain a considerable amount of gaseous impurities. Such molten steel may be transferred into a vessel, for further refinement therein. More particularly, molten steel as delivered from a converter may be transferred into a ladle, and a deoxidizer and/or a desulfurizer is added therein so as to isolate such impurities in the form of floating slag. If the slag should not be removed completely, the residual impurities may be redistributed throughout steel ingots, which impurities will exert detrimental effects on the succeeding rolling and other processes. In short, the residual impurities left in a refined metal by complete slag-off may result in an inferior quality of the final products.

Theerfore, an object of the present invention is to obviate such difficulties in slag-removal or slag-off by providing an improved device and method for readily and completely removing slag by using a plate member having an opening and which is fitted to a vessel containing a molten metal for collecting and isolating slag floating on the surface of the molten metal.

In a device according to the present invention, a molten metal is placed in a vessel with an open top through which one or more composition-controlling agents may be added and slag making agents, and a plate member having a hole bored therethrough is disposed on the top of the molten metal through the open top of the vessel so that the lower surface of the plate member may contact the top surface of the molten metal by moving the plate member down through the slag floating on the metal, whereby the slag is collected to the hole of the plate member for ready and complete removal thereof.

For a better understanding of the invention, reference is made to the accompanying drawings, in which:

FIG. 1 is a schematic perspective view illustrating the manner in which a slag-removing device of the present invention operates;

FIG. 2 is a vertical sectional view of an embodiment of the present invention showing a weight member placed on a plate member;

Like parts are designated by like numerals throughout the drawings.

Referring to FIG. 1, a molten metal, such as pig iron or steel as delivered from a blast furnace or a steel refining furnace is poured into a vessel 1, which is hung by the hook means 2 of a crane for transportation. One or more composition-controlling agents or slag making agents, e.g., carbide and soda ash, are selectively added into the molten metal so that undesirable ingredients may be separated in the form of slag. To facilitate the tilting of the vessel 1 for removing the slag, the vessel 1 may be hung at three points, as shown in the figure.

Figure 3:
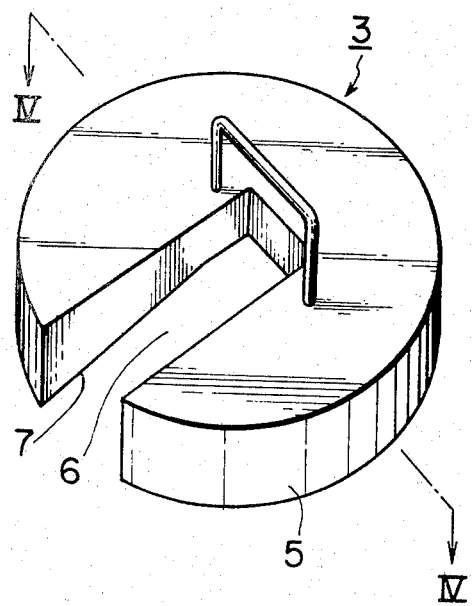
FIG. 3 is a perspective view of a plate member usable in a device according to the present invention.

A plate member 3, as shown in FIG. 3, is placed or inserted in a working position in the top of the molten metal through the open top of the vessel 1. Thus, the top of the molten metal is covered by the plate member 3, as shown in FIG. 2. It is preferable to leave a suitable gap between the outer peripheral surface 5 of the plate member 3 and the inner peripheral surface 4 of the vessel 1 to allow smooth movement of the plate member 3 on the molten metal. If, however, the gap between the peripheral surfaces 4 and 5 is too large, the slag may be forced into such gap and the removal of the slag from such gap will become extremely difficult. Accordingly, due care should be taken to provide the gap with dimensions large enough for smooth movement of the plate member 3 in the vessel 1 yet small enough for preevnting entry of any of the slag therein.

An opening 6 is bored through the plate member 3 for the collection and removal of the slag, as will be described hereinafter. In the embodiments of FIGS. 1 to 3, the opening 6 extends radially through the body member to the peripheral edge thereof. The shape and the magnitude of the opening 6, however, are not limited as shown. It is sufficient for such an opening to penetrate through the plate member 3 for carrying out the purpose of the present invention.

Figure 4:
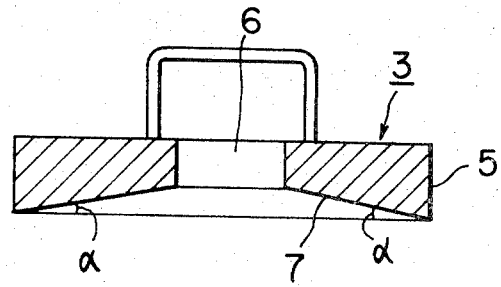
FIG. 4 is a sectional view taken along the line IV—IV of FIG. 3.

Referring to FIG. 4, in order to collect the floating slag at the opening 6, an underside or lower surface 7 of the plate member 3 should be sloped or inclined upwards from the periphery of the member 3 toward the edge of the opening 6. The slope of the back surface 7 of the plate member 3 relative to a plane parallel to the top surface of a molten metal to be treated is represented by a symbol α in FIG. 4. In FIGS. 3 and 4, the plate member 3 is of generally disk shape with a flat top surface and the opening 6 is a radial notch whose radial length is longer than the radius of the disk. In this case, the slope α represents the smaller one of the two angles defined between a plane parallel to the flat top surface and the sloped back or lower surface of the plate member 3. With such inclined back surface 7, the slag floating on the top surface of the molten bath is forced toward the opening 6 wherein same is collected as the plate member 3 is forced downwards. The inclined surface 7 exerts a greater force on the periphery of the slag than at the center of the slag whereby the slag is directed radially inwardly into the center of the opening when the plate member 3 is placed on the molten refined metal. The fluidity of the slag mainly depends on the viscosity thereof, which viscosity is in turn a function of the composition and the temperature of the slag. Accordingly, the slope α of the back surface 7 of the plate member 3 is determined in dependence upon the kind and the temperature of the slag to be treated. Generally speaking, a large slope α is used for treating slag with a larger viscosity.

Figure 5:
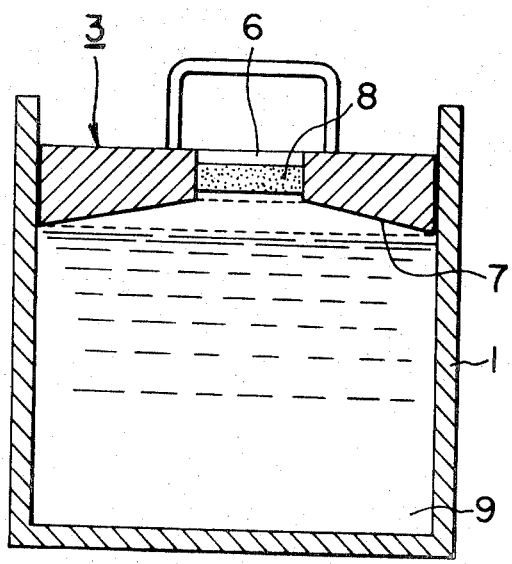
FIG. 5 is a perspective view of a vessel for holding molten metal and which is provided with a device of the present invention.

Referring to FIG. 5, when a slag-removing device consisting of a plate member 3 of the aforesaid construction is disposed on a molten metal with slag floating thereon, the slag moves toward an opening 6 of the plate member 3 along the sloped back surface 7. Thus, a slag layer 8 is formed in the opening 6 and the slag is separated from a refined molten metal 9. The inventors have found it preferable to keep the inclined back surface 7 in contact with the refined molten metal 9 but away from the slag layer 8. For this purpose, the plate member 3 may be made of a substance whose specific gravity is greater than that of the slag layer 8 but smaller than that of the refined molten metal 9. In this case, if slag floating on the molten metal 9 comes in contact with the back surface 7 of the plate member 3, the slag moves toward the opening 6 along the sloped back surface 7 due to the difference of the specific gravity between the plate member and the slag. In practice, however, if the material for the plate member 3 is limited to such materials with the aforesaid specific gravity, the manufacture of the plate member tends to become too complicated. Accordingly, in the slag-removing device of the present invention, the specific gravity of the plate member 3 per se is not restricted to any particular range. More particularly, the plate member 3 may be made of steel plates with or without a refractory coating, irrespective of the value of the specific gravity of the plate member per se. After placing such plate member 3 on the top surface of a molten metal, a suitable weight member 10 can be mounted on the upper surface of the plate member 3 for adjusting the apparent specific gravity of the plate-weight combination to a desired value, as illustrated in FIG. 2.

In the embodiment of FIG. 2, the outer peripheral surface 5 of the plate member 3 is deviated from a vertical to the top surface of the member 3 so that the peripheral surface 5 may cooperate with a suitably inclined vessel 1. It is, of course, possible to form the outer peripheral surface 5 substantially in parallel with a line perpendicular to the top surface of the plate member 3, as shown in FIGS. 3 to 5. Although circular plate members 3 are illustrated, the shape of the plate member 3 can be modified in any suitable manner so as to fit in a given vessel of specific shape for effective collection and removal of the slag.

After being collected in the form of the layer 8, the slag may be removed from the molten metal, for instance, by pouring the slag layer 8 by inclining the vessel 1. It is also possible to use a removing rod or a rake 11 for the removal of the slag layer 8, as shown in FIG. 2. The bar or the rake 11 may be manually operated. It is also possible to operate the bar or the rake 11 by a suitable power-driven mechanism.

As described in the foregoing disclosure, according to the present invention, there is provided a slag-removing device consisting of a plate member having a hole bored therethrough and an inclined back or lower surface extending upward from the periphery of the plate member toward the edge of the hole. When the slag-removing device is placed on a molten metal with slag floating on the top surface thereof, the slag is guided and directed to the hole of the plate member along the inclined lower or back surface thereof. By such a construction, the slag is isolated from the molten metal so that the slag thus collected and isolated can easily and completely be removed from the molten metal. Thus, a refined molten metal can be achieved which is entirely free from any residue of the slag.

The guiding and directing of the slag to the hole of the plate member wherein same is collected greatly simplifies the slag-removal or slag-off process by limiting the operation to the proximity of the hole. With such device, the entire process of the slag-removal or slag-off can be efficiently mechanized.

Since the inclination of the back or lower surface of the plate member extends upward from the periphery of the plate member toward the hole and since the apparent specific gravity of the plate member, inclusive of an optional weight member, is selected between that of the slag and that of the refined molten metal, the directing of the slag toward the hole can be effected even if the viscosity of the slag varies in a limited range. Thus, the effective and complete removal of the slag can be ensured from the desired refined molten metal. Furthermore, with the device of the invention, the loss of the desired molten metal is minimized at the time of the slag-removal or slag-off.

What is claimed is:

1. A slag-removing device for use with an open-top vessel containing therein during usage a molten refined metal with slag floating on the top surface thereof, said slag-removing device comprising: a plate member having an apparent specific gravity greater than that of the slag but less than that of the refined metal and dimensioned to be inserted in a working position in the top portion of the open-top vessel whereby said plate member floats on the molten refined metal, means defining an opening through said plate member extending radially from an inner portion thereof outwardly to the periphery thereof, said plate member having a peripheral surface portion facing the inner peripheral surface of the vessel and spaced-apart therefrom when said plate member is in said working position a distance large enough to allow slight movement of said plate member relative to the vessel while effectively inhibiting the entry of the slag therein, said plate member having on the underside thereof an inclined surface extending upwardly from the periphery of said plate member to the edge of said opening having sufficient inclination to direct the slag floating atop the molten refined metal radially inwardly towards said opening when said plate member is placed in said working position, and slag-removing means for removing the slag collected in said opening.

2. A slag-removing device according to claim 1, wherein said plate member has a substantially cylindrical pheripheral surface and a flat top surface disposed in a horizontal position when said plate member floats on the molten metal in said working position, said cylindrical peripheral surface having a central axis inclined relative to a vertical axis extending through the center of said top surface whereby said plate member may fit in the vessel after the vessel is inclined by a certain angle.

3. A slag-removing device according to claim 1, wherein said plate member is composed of steel, and a weight removably placed on said plate member for selectively varying the weight thereof whereby the apparent specific gravity of the plate member-weight combination is maintained greater than that of the slag but less than that of the refined metal.

4. A slag-removing device according to claim 3, wherein said plate member composed of steel is provided with a refractory coating.

5. A method for removing slag from molten metal contained within an open-top vessel comprising: providing an open-top vessel containing therein molten refined metal with slag floating on the top surface thereof, placing on the top surface of the molten metal a plate member having means therethrough defining a radial opening extending radially from the center to the periphery of said plate member and having an inclined lower surface extending upwardly from the periphery of said plate member to the edge of said opening so that the inclined lower surface of said plate member directs the slag to said radial opening wherein same is collected, raking the slag collected in said radial opening radially outwardly along said radial opening to the periphery of said plate member to remove the slag from the vessel before the molten refined metal contained within the vessel solidifies.

References Cited

UNITED STATES PATENTS

| | | | |
|---|---|---|---|
| 3,595,549 | 7/1971 | Sköld | 266—37 |
| 3,632,096 | 1/1972 | Perry | 75—46 X |
| 2,612,667 | 10/1952 | Gombosh | 249—197 |
| 848,840 | 4/1907 | Moore | 266—37 |
| 500,621 | 7/1893 | Sheedy et al. | 266—37 |
| 43,891 | 8/1864 | Arnold | 75—61 |
| 55,452 | 6/1866 | Arnold | 75—61 |
| 484,659 | 10/1892 | Keiper | 266—37 |
| 929,688 | 8/1909 | Monnot | 164—134 |
| 1,997,988 | 4/1935 | Wever | 75—61 X |
| 3,516,478 | 6/1970 | Dunn et al. | 266—37 X |
| 3,265,347 | 8/1966 | Wickström | 249—197 X |

FOREIGN PATENTS

| | | | |
|---|---|---|---|
| 1,912,410 | 11/1969 | Germany | 266—37 |

L. DEWAYNE RUTLEDGE, Primary Examiner

W. R. SATTERFIELD, Assistant Examiner

U.S. Cl. X.R.

75—46; 164—134; 266—1 R, 37